Nov. 12, 1946.  G. L. NAMPA  2,410,895
PISTON
Filed Dec. 6, 1944
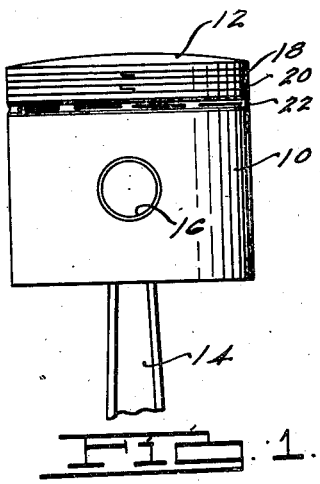
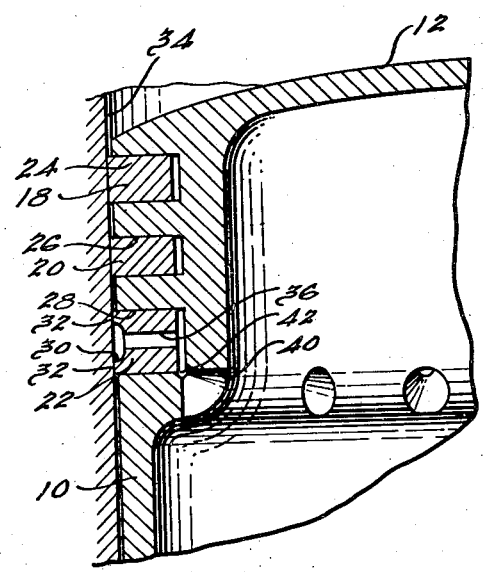
INVENTOR.
George L. Nampa,
BY
Harness, Dickey & Pierce.
ATTORNEYS.

Patented Nov. 12, 1946

2,410,895

UNITED STATES PATENT OFFICE 2,410,895

PISTON

George L. Nampa, Royal Oak, Mich., assignor to Mathew E. Nampa, Detroit, Mich.

Application December 6, 1944, Serial No. 566,811

4 Claims. (Cl. 309—8)

This invention relates to pistons for internal combustion engines and has for its principal object the provision of such piston of improved characteristics.

Objects of the invention include the provision of a piston having a piston ring groove therein and an oil seal or oil drain type of piston ring therein, the piston being provided with drainage passages leading from the bottom of the ring groove to the interior of the piston whereby to return oil scraped from the cylinder wall by the ring to the crankcase of the engine, the drainage holes being so constructed and arranged as to minimize the blocking or plugging of the same by the building up of carbon in such holes during operation; the provision of a construction as above described in which the drainage holes substantially increase in cross-sectional area from approximately their point of connection with the ring groove to substantially their point of emergence on the inner face of the piston; and the provision of a construction as above described in which the oil drain holes are substantially frustoconical in conformation and arranged with the small end of the hole at the ring groove end thereof.

The above being among the objects of the present invention, the same consists in certain novel details of construction to be hereinafter described with reference to the accompanying drawing, and then claimed.

In the accompanying drawing which illustrates a suitable embodiment of the present invention and in which like numerals refer to like parts in both the views, Fig. 1 is a side elevational view of an engine piston showing a portion of the connecting rod conventionally secured thereto; and Fig. 2 is an enlarged fragmentary, sectional view taken axially through the piston shown in Fig. 1 and illustrating a fragment of an engine cylinder in operative relation with respect thereto.

It is commonly recognized that there is a tendency in internal combustion engines for lubricant which is introduced to the cylinder walls for the purpose of lubricating the piston in its movement therein to work up past the piston and into the combustion chamber, past the piston rings which are conventionally employed to provide a gas-tight seal between the piston and the cylinder wall. The passage of such oil to the combustion chamber is undesirable for the reason that it is burned therein and builds up deposits of carbon in the combustion chamber, material amounts of which materially detract from the operating efficiency of the engine. Accordingly, it is common practice to provide one piston ring, usually the first one above the wrist pin employed to connect the piston to its corresponding connecting rod, in the form of an oil seal or oil scraper ring, the purpose of which is to scrape undesirable amounts of oil from the cylinder wall. Such oil seal or oil scraper ring is conventionally formed to scrape excess oil from the wall of the cylinder and into the groove of the piston in which such ring is received, and the piston is provided with a plurality of holes leading from the bottom rear edge of such groove into the interior of the piston so that such oil that is scraped from the cylinder wall by such ring is returned through the piston to the crankcase of the engine, there to be re-used for lubricating purposes.

It has heretofore been the practice to form such holes leading from the groove for the oil seal or oil scraper ring to the interior of the piston, and which holes are commonly known as oil drain holes, as simple drilled holes, and consequently of cylindrical formation throughout. Necessarily, they are of relatively small diameter. Such holes function perfectly as long as they are open and free to pass the oil through them without restriction. However, it is impossible and, of course, not desirable to remove all the oil from the wall of the cylinder by the oil seal or oil scraper ring as to do so would eliminate the very purpose of providing the oil in the first place. As a result, small amounts of oil necessarily adhere to the wall of the cylinder and portions of this are carbonized by contact with the heat of combustion of the combustible mixture which is burned in the outer end of the cylinder, and amounts of such carbon naturally find their way into the groove for the oil seal ring along with the oil scraped off of the cylinder wall thereby. In addition, carbon may form in such groove, or in the oil drain holes themselves, because of the high working temperature of the piston in service. In any event, it is common occurrence for such carbon to collect in the oil drain holes and gradually build up until such holes often become completely plugged, thus destroying the efficiency of the oil seal ring and inevitably permitting the unregulated flow of oil along the cylinder wall past the piston to the combustion chamber, a condition which is commonly known as oil pumping.

It has been observed, in studying the pistons of internal combustion engines after various lengths of operation, that the carbon deposit in the oil drain holes usually begins to build up at the inner or discharge ends thereof, the deposit then gradually working up towards the entrance end of the holes, but the deposit is usually found to be greater at the discharge end thereof and the final plugging usually occurs at the inner or discharge end of such holes.

I have discovered that the average length of time of operation of an engine before plugging of the oil drain holes in the pistons occurs may be materially lengthened if such holes are formed to provide an increasing cross-sectional configuration from the entrance end thereof to the discharge end thereof. Obviously, by increasing this length of time it correspondingly increases the length of time which the associated engine may continue to operate without requiring tearing down and repairing because of excessive oil pumping. It will be appreciated that the practical embodiment of the present invention does not require that such oil drain holes increase in cross-sectional area from the exact point of connection thereof with the oil seal ring groove or to continue to expand fully to the interior face of the piston, but a substantial compliance with such feature results in substantial benefit as provided by the practice of the present invention. Similarly, the cross-sectional contour of such oil drain holes is not important as long as cross-sectional area thereof increases from approximately the entrance end thereof to the discharge end thereof. In other words, the holes may be of round cross-sectional configuration as will be provided by drilling or the like, of generally rectangular configuration as may be obtained by slotting or the like, or various other cross-sectional configurations, depending upon the particular type of machining or other type of operation employed to produce the same. Ordinarily, a circular cross-sectional configuration such as is provided or obtained in a drilling or countersinking operation is preferable and this is the type of cross-sectional configuration shown in the drawing by way of illustration.

It will be understood, of course, that the present invention is applicable to any one of the various forms and/or types of pistons conventionally employed in internal combustion engines, that shown in the drawing by way of illustration being of the simplest type merely for the purpose of simplicity in description.

Referring to the drawing, and particularly to Fig. 1, the piston is indicated generally at 10, of conventional cylindrical construction having a slightly domed head 12 and being connected to the upper end of a conventional connecting rod 14 by a conventional piston pin or wrist pin 16. The piston 10 is shown as being provided at its upper end with three piston rings 18, 20 and 22, respectively, arranged in axially spaced relation with respect to each other and each, of course, being received in corresponding ring grooves 24, 26 and 28, respectively, indicated in Fig. 2. The rings 18 and 20 are shown as plain rings in accordance with conventional practice and the ring 22 is shown as of a conventional oil seal or oil scraping type of ring although, as previously explained, any suitable or conventional type of oil seal or oil scraper ring may be employed in accordance with the present invention. The particular ring 22 shown is provided with a central annular groove 30 in its outer face which, therefore, results in two narrow pressure bands 32 at each axial edge thereof for actual contact with the wall of the co-operating cylinder, a fragment of which is indicated at 34. Any oil in the cylinder which succeeds in passing upwardly beyond the lower pressure band 32 finds its way into the groove 30 and escape upwardly therefrom is prevented, or at least restricted, by the upper pressure band 32. The ring 22 is intermittently slotted around its circumference as at 36 from the center of the groove 30 to the radially inner face of the ring so that any oil which is thus trapped in the groove 30 may flow through the slot 36 to the inner end of the ring groove 28. Additionally, and particularly where the ring 22 is permitted a slight amount of axial play in the groove 28, during downward movement of the piston in the cylinder 34 the ring 22 will move to the upper edge of the slot 28 and oil scraped from the cylinder wall 34 by the lower edge of the ring 22 may flow between it and the lower edge of the groove 28 to the back face of the groove.

Now as previously explained, in conventional constructions oil drain holes of a constant diameter are conventionally drilled inwardly and usually downwardly from the lower inner edge of the groove 28 receiving the oil seal or oil scraper ring to the interior of the piston to permit such oil which has passed to the inner face of the groove 28 to be discharged to the interior of the piston where it may readily find its way back into the crankcase of the engine, there to be recirculated by the engine lubricating system. Furthermore, as previously explained, where these holes are cylindrical as conventionally employed, carbon deposits build up therein and such deposits usually begin by building up at the inner end of such holes.

To offset or least minimize this last-mentioned effect, in accordance with the present invention, such holes are formed to provide an increasing cross-sectional area from their point of connection with the groove 28 to their point of connection with the interior wall of the piston 10. In the drawing such holes are illustrated at 40 and by way of illustration as of frusto-conical character, the small end of the hole being closely adjacent to the point of connection with the ring groove, the large end being at the inner face of the piston 10. In forming the particular holes shown, first conventional cylindrical holes, a portion of which is illustrated at 42, may be drilled down from the outside of the piston through the lower corner of the ring 28 toward the axis of the piston and through the inner surface of the piston. These holes are conventionally formed by drills whose points initially strike the lower inner corner of the ring groove and which drills barely clear the radially outer and upper edge of the ring groove, normally resulting in a hole which extends down angularly at an angle of approximately 45° to the axis of the piston. These holes are then modified in accordance with the present invention by employing a drill or a countersink type of tool having a frusto-conical end, or at least cutting edges which lie in a frusto-cone, and by drilling or machining from the inside of the piston toward the outside centrally of each of the holes 42, such holes are caused to be enlarged to form the holes 40. It is not necessary that this countersinking be carried on completely into the ring groove 28 but preferably it is stopped short of actual contact therewith by a small amount, such as indicated in the drawing, as under such conditions the purposes of the present invention will be carried out from a practical standpoint.

By thus forming the all-drain holes as above described, the circumference of the holes at the inner ends thereof is so enlarged as compared to the opposite end thereof that, although the same amount of carbon deposit may build up as in a conventional oil drain hole, its effectiveness in closing the hole to the drainage of oil therethrough is so materially reduced that the disadvantages of conventional type cylindrical holes is eliminated to all practical purposes, and it is found that oil drain holes formed in accordance with the present invention seldom, if ever, will become completely plugged to the flow of oil therethrough during the useful life of the corresponding pistons and rings.

Having thus described my invention, what I claim by Letters Patent is:

1. A piston for an internal combustion engine having a circumferentially extending groove formed therein for reception of an oil scraper ring and having a plurality of openings leading from the radially inner end of said groove to the interior surface of said piston, said openings substantially increasing in cross-sectional area from approximately their point of connection with said ring groove to approximately their point of connection with the inner surface of said piston.

2. A piston for an internal combustion engine having a circumferentially extending annular groove formed therein for reception of an oil scraper piston ring, said piston having a plurality of holes extending from the inner face of said groove and at that edge thereof opposite the head of said piston through the interior surface of said piston, said openings generally increasing in cross-sectional area from said groove to said inner face.

3. In combination, a piston for an internal combustion engine having a circumferentially extending continuous groove therein, an oil scraper type of piston ring received in said groove, and said piston having a plurality of circumferentially spaced holes therein extending from the inner edge of said groove to the inner wall of said piston, said openings generally increasing in cross-sectional area from approximately their point of opening onto said groove to approximately their point of opening onto said inner face.

4. In combination, an engine cylinder, a piston reciprocable in said cylinder, said piston having a circumferential groove therein, an oil scraper type of piston ring received in said groove and bearing against the wall of said cylinder, said ring being formed to scrape oil from the wall of said cylinder and deliver it to the radially inner face of said groove, and said piston being provided with a plurality of holes therein extending from said inner face of said groove through the inner surface of said piston, said holes generally increasing in cross-sectional area from their point of connection with said groove to approximately their point of emergence on said inner surface.

GEORGE L. NAMPA.